United States Patent
Maryon et al.

(10) Patent No.: US 9,577,969 B2
(45) Date of Patent: Feb. 21, 2017

(54) SINGING TELEGRAM

(75) Inventors: Dean Maryon, Amsterdam (NL); Alan Moseley, Amsterdam (NL)

(73) Assignee: The Western Union Company, Englewood, CO (US)

( * ) Notice: Subject to any disclaimer, the term of this patent is extended or adjusted under 35 U.S.C. 154(b) by 1048 days.

(21) Appl. No.: 13/493,566

(22) Filed: Jun. 11, 2012

(65) Prior Publication Data

US 2013/0332304 A1    Dec. 12, 2013

(51) Int. Cl.
*G06Q 30/00* (2012.01)
*H04L 12/58* (2006.01)
*G11B 27/034* (2006.01)

(52) U.S. Cl.
CPC .......... *H04L 51/066* (2013.01); *G11B 27/034* (2013.01)

(58) Field of Classification Search
CPC .... G06Q 30/0621; G06Q 30/00; B42D 3/123; G10H 1/361
USPC ................................. 705/26.1, 27.1
See application file for complete search history.

(56) References Cited

U.S. PATENT DOCUMENTS

| | | | |
|---|---|---|---|
| 8,046,266 B1* | 10/2011 | Geller et al. | 705/26.1 |
| 2006/0058101 A1* | 3/2006 | Rigopulos | 463/35 |
| 2009/0327121 A1* | 12/2009 | Carroll et al. | 705/39 |
| 2010/0201693 A1* | 8/2010 | Caplette et al. | 345/474 |
| 2011/0164787 A1* | 7/2011 | Legagneur | A45D 44/005 382/103 |
| 2013/0323689 A1* | 12/2013 | Bates et al. | 434/167 |

OTHER PUBLICATIONS

Anonymous, "The significant developments taking place in printed electronics today," Business Wire, Jul. 27, 2005.*

* cited by examiner

*Primary Examiner* — Brandy A Zukanovich
(74) *Attorney, Agent, or Firm* — Kilpatrick Townsend & Stockton LLP

(57) ABSTRACT

A method for generating an electronic message having the appearance of an individual performing a song with a musical artist includes: receiving a selection of a video segment, receiving an image of an individual's face, receiving a recording of the individual signing the song, generating the electronic message from the video segment, receiving information about a recipient of the electronic message, and transmitting the electronic message to the recipient. The video segment includes: a song, a musical artist performing the song, and a character performing the song with the musical artist. Generating the electronic message includes: overlaying the image of the individual's face onto a facial area of the character, simulating movement of one or more facial features of the image, and synchronizing the recording of the individual signing the song with the simulated movement of the facial features.

21 Claims, 13 Drawing Sheets

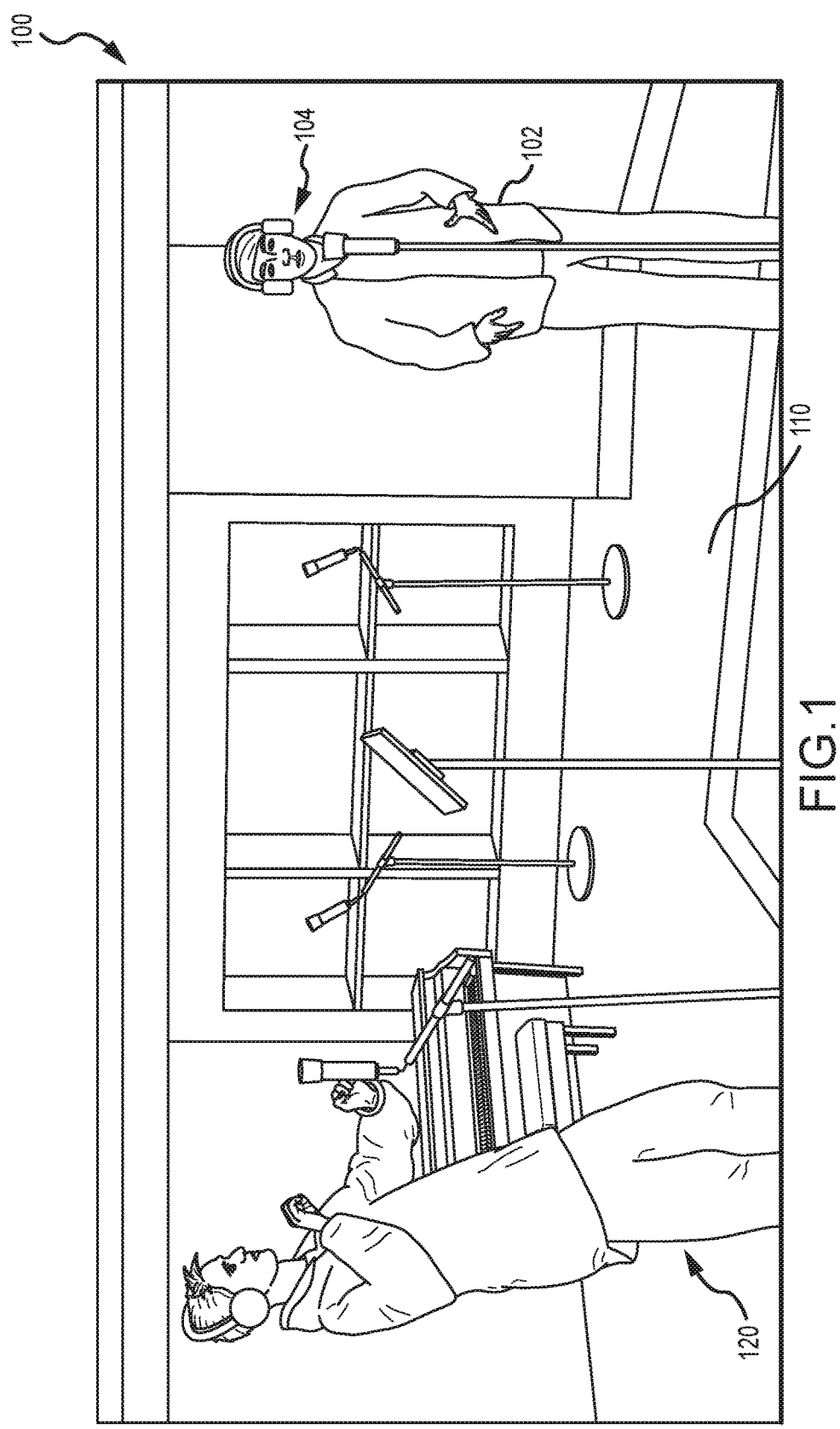

SINGING TELEGRAM

FIELD OF THE INVENTION

The present invention relates, in general, to electronic messages and, more particularly, to electronic messages having the appearance of an individual performing a song with a musical artist such as, for example, a singing telegram.

BACKGROUND OF THE INVENTION

Messages play an important role in society and business because they offer a way for information to be communicated between individuals and/or entities. Messages have been used throughout history, but the manner of relaying messages has frequently changed with advances in technology and communication. For example, in the past, messages were relayed verbally between individuals or written down on a medium, such as paper, and delivered to a desired recipient of the message. Messages could be delivered over long distances with the development of organized mail delivery systems, such as governmental postal services. Delivery of the such messages increased as advances in technology allowed motorized vehicles, such as cars and planes, to replace horses and other earlier message delivery forms.

The invention of the telegraph provided a new mechanism for delivering messages and allowed messages to be rapidly transmitted over large distances. Similarly, the invention of the telephone allowed individuals or entities to personally delivery messages verbally over large distances. The use of answering machines further allowed messages to be delivered verbally even when a recipient of the message was unavailable to answer a telephone call. The invention of the computer, various networks (e.g., the Internet), wireless devices (e.g., cell phones), and the like have likewise provided new mechanisms for delivering messages that allow rapid delivery and dissemination of information over large distances and/or to multiple recipients. For example, individuals and entities often send and receive electronic messages via email, text messaging (e.g., SMS, MMS, and the like), tweets, social media profile updates, and the like.

Due to the importance of messages in society and business, there is a constant need for new and innovative ways to send messages.

BRIEF SUMMARY OF THE INVENTION

Embodiments of the invention provide electronic messages having the appearance of an individual performing a song with a musical artist such as, for example, a singing telegram. The featured musical artists may be famous or recognizable artists that composed the featured songs, or that otherwise perform the songs. According to one embodiment, a method for generating an electronic message having the appearance of an individual performing with a musical artist is provided. The method may include receiving from a user of an electronic message generation system or application, a selection of a video segment that includes a featured song, a featured musical artist performing the song, and a character or actor performing the song with the musical artist. An image may then be received from the user, such as by uploading the image to the electronic message generation system or application. The image may include an individual's face that is to be overlaid onto a facial area or region of the character or actor. A recording of the individual (or another individual) singing the song may also be received from the user, such as by uploading the recorded song or recording the individual singing the song with the electronic message generation system or application.

The electronic message may then be generated from the video segment by: overlaying the image of the individual's face onto the facial area or region of the character or actor, graphically adjusting one or more facial features of the image of the individual's face to simulate movement of the facial features (e.g., blinking eyes and/or moving mouth), and/or synchronizing the recording of the individual signing the song with the simulated movement of the facial features. Overlaying the image of the individual's face allows the electronic messages to have the appearance of the individual performing the song with the musical artist. Simulating movement of one or more facial features provides lifelike facial expressions for the character and thus, makes the electronic message appear more lifelike and/or believable. Similarly, synchronizing the recording with the simulated facial movements provides a lifelike appearance of the individual signing the song and performing with the featured musical artist.

Information about a recipient of the electronic message may be received from the user, such as by being input into the electronic message generation system or application, and the electronic message may be transmitted to the recipient based on the recipient information received from the user. For example, the electronic message may be sent to the recipient's email address, wireless device, website, social media account or profile, and the like.

In some embodiments, account information for an account associated with the recipient may also be received from the user. A funds transfer transaction may be staged, for example, by a funds transfer provider in order to transfer funds to the account associated with the recipient and the funds transfer transaction may be associated with the electronic message. The recipient may be notified of the funds transfer transaction by receiving the electronic message, or the electronic message may be sent in addition to a separate funds transfer transaction notification. In one embodiment, associating the funds transfer transaction with the electronic message may include receiving a transaction identifier from the user where the transaction identifier is previously provided to the user in response to the funds transfer transaction staging process.

According to another embodiment, a method for generating an electronic message having the appearance of an individual performing with a musical artist is provided. The method may include receiving a selection of a video segment from a user. As previously described, the video segment may include: a song, a musical artist performing the song, and a character performing the song with the musical artist. An image of the individual's face to overlay atop a facial region of the character may be received and the electronic message may be generated from the video segment by: overlaying the image of the individual's face onto a facial area of the character and, optionally, simulating movement of one or more facial features of the image to provide lifelike facial expressions and/or mannerisms for the character. Information about a recipient of the electronic message may be received from the user and the electronic message may be transmitted to the recipient based on the recipient information received from the user.

In some embodiments, a facial feature (e.g., an eye, nose, mouth, chin, and the like) of the image may be recognized to align the image with the facial area of the character or to ensure that the image includes a face. In one embodiment, simulating movement of one or more facial features may include simulating movement of the image's lips and/or eyes. In another embodiment, the image of the individual's face may be overlaid atop the character's facial region to simulate a depth of one or more facial features of the image (e.g., depth of eyes, cheeks, lips, chin, and the like) to provide a lifelike appearance for the character.

In some embodiments, the method may also include: recording the user signing the song and synchronizing the recording of the user signing the song with the simulated movement of the one or more facial features of the image to provide a lifelike appearance of the individual signing the song. In recording the user signing the song, the song lyrics may be displayed on a display screen while the user sings the song and/or the musical artist may be displayed performing the song while the user sings the song. Subsequent to the recording process, or optionally subsequent to the user uploading a recording of the song, one or more parameters of the recording may be adjusted according to defined standards and/or the user's satisfaction. The adjusted parameters may include: a volume of the recording in relation to the volume of the musical artist or the music, a pitch of the recording, and/or a tone of the recording. In some embodiments, one or more of these parameters may be adjusted automatically.

In some embodiments, the electronic message may be associated with a funds transfer. Associating the electronic message with the funds transfer may include: receiving, from the user, account information of an account associated with the recipient; staging the funds transfer to transfer funds to the account associated with the recipient; and associating the funds transfer with the electronic message, such as by receiving a transaction identifier from the user. The transaction identifier may have been previously provided to the user after the funds transfer is staged, or otherwise set up or established.

According to another embodiment, a system for generating an electronic message having the appearance of an individual performing with a musical artist is provided. The system may include a memory device and a processor coupled with the memory device. The memory device may have instructions stored thereon which, when executed by the processor, cause the processor to perform the following operations: receive a selection of a video segment from a user, receive an image of the individual's face to overlay onto a facial area of the character, generate the electronic message from the video segment, receive information about a recipient of the electronic message, and transmit the electronic message to the recipient based on the recipient information received.

As previously described, the video segment may include: a song, the musical artist performing the song, and the character performing the song with the musical artist. Also, the electronic message may be generated by: overlaying the image of the individual's face onto the facial area of the character and/or simulating movement of one or more facial features of the image to provide lifelike facial expressions for the character.

The instructions encoded on the memory device may further cause the processor to: receive a recording of the individual signing the song and synchronize the recording with the simulated movement of the one or more facial features of the image. The instructions may additionally cause the processor to: receive account information for an account associated with the recipient, stage a funds transfer transaction to transfer funds to the account associated with the recipient, and associate the funds transfer transaction with the electronic message.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

FIG. 1 illustrates a screenshot of an electronic message providing the appearance of an individual performing with a musical artist.

DETAILED DESCRIPTION OF THE INVENTION

Figure 2A:
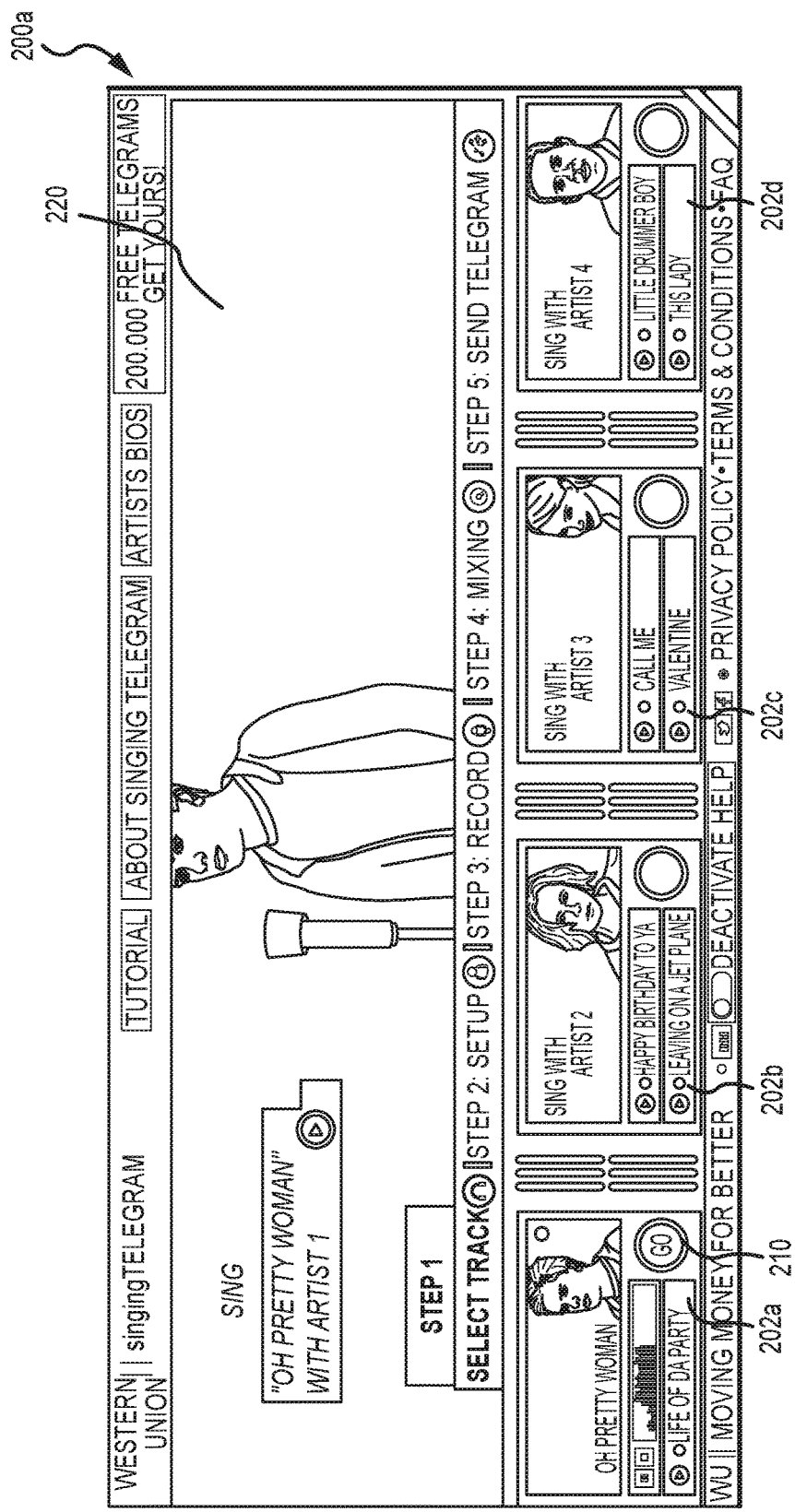
FIGS. 2A-2G illustrate various screenshots of a message generation system or application that may be used to generate the electronic messages described herein.

Embodiments of the invention provide electronic messages having the appearance of an individual performing a song with a musical artist, which is often a famous or recognizable musical artist that composed the song, or to whom the song is otherwise attributed. The electronic messages may be sent by senders or users (referred to herein generally as users) to recipients for various occasions, such as birthdays, anniversaries, special events (e.g., graduation), and/or for any other purpose. The messages may also be sent randomly for no reason at all such as, for example, as part of a humorous email or text message. In one embodiment, an electronic message may be sent with a notification of an event or transaction such as, for example, part of a funds transfer transaction, or as a means of notifying the recipient of an upcoming event, such as a graduation or reunion party. In one embodiment, the sender of the electronic message may be the individual that is depicted as performing with the musical artist. In another embodiment, the recipient or another individual may be the person that is depicted as performing with the musical artist.

The electronic message may be a video clip or segment that depicts the musical artist singing the song and/or dancing to the song. A character or actor is also depicted in the video clip or segment as singing the song and/or dancing to the song. An image of the individual (e.g., a photograph of the individual's face) is overlaid onto a facial region of the character or actor so that the character or actor appears to be the individual and the individual appears to be performing the song with the musical artist. The individual, such as the sender, may also record themselves singing the song and the recording may be synchronized with the video segment's music so that the individual is depicted as singing the song and the individual's voice is heard actually singing the song. The recording may be mixed, modified, or otherwise adjusted, automatically and/or by the individual (e.g., sender), so that the audio portions of the video segment sound like the individual is singing the song with the musical artist.

The individual may upload an image of themselves (or of another individual such as the recipient) that is overlaid onto the character or actor depicted in the video segment performing with the musical artist. For example, an image of the individual's face may be copied or otherwise received from the uploaded image and overlaid onto a facial area, portion, or region of the character or actor depicted as performing with the musical artist. In this manner, the character or actor depicted in the video segment performing with the musical artist may have the appearance of the individual.

To enhance the realism or appearance of the electronic message, various facial features of the individual's image overlaid onto the character may be simulated as moving. For example, the lips of the individual's image may be simulated as moving in synchronization with the lyrics of the song. The eyes of the individual's image may also be simulated as moving to provide a lifelike appearance of the character. The characters head and the overlaid image may also move, twist, turn, bend, and the like, in unison or synchronization so that the character and overlaid facial image have lifelike expressions and motions.

The individual's image may also be overlaid onto the character so that various facial features of the image appear to have depth. For example, the nose, cheeks, eyes, chin, and the like, may be overlaid on the character so that these facial features appear to have appropriate facial feature depths, such as the nose appearing in front of the eyes, cheeks, chin, and the like. The other facial features may be similarly overlaid to provide lifelike facial expressions and features.

In one embodiment, the electronic message may be associated with a funds transfer transaction. For example, the electronic message may be sent along with or in addition to a notification that funds are being transferred from the sender to the recipient. The sender may stage the funds transfer transaction by accessing an online website of a funds transfer provider or by utilizing a retail location, an agent of the funds transfer provider, a kiosk, and the like. In response to staging the funds transfer transaction, the sender may be provided with a transaction identifier and/or a link to a website that hosts a program designed to generate the electronic messages. The sender may input, enter, or otherwise provide the transaction identifier at an appropriate location on the website and be allowed to generate an electronic message that is subsequently sent to the recipient along with, or in addition to, a message that notifies the recipient that funds are being provided or sent to the recipient from the sender. These and other aspects of the invention will be more evident with respect to the description of the figures below.

Referring now to FIG. 1, illustrated is a screenshot of an electronic message 100 having the appearance of an individual 104 performing a song with a musical artist 120, which is often a famous musical artist that composed or contributed to the composition of the song, or to whom the song is otherwise attributed. Electronic message 100 is a video clip or segment of the musical artist 120 performing the song in a setting 110, such as on a set or in a recording studio. The video segment also depicts a character 102 performing the song alongside the musical artist 120 in the recording studio 110, on set, or at another location or setting. The video segment is presented in a manner such that it appears as if the character 102 is performing the song (e.g., singing the song and/or dancing) alongside the musical artist 120. Stated another way, the video segment has the appearance of the character 102 being featured in a music video alongside the musical artist 120, or vice versa. The video segment may be a recording of the musical artist 120 and character 102 performing the song in studio 110 or musical artist 120 and/or character 102 may be animations that are graphically portrayed in studio 110.

An image of the individual may be overlaid on character 102 so that character 102 appears to be the individual. For example, a facial image 104 may be overlaid atop a facial region of character 102 so that character 102 has the visual appearance of the individual. In this manner, the video segment appears to show the individual performing the song with the musical artist 120. Movement of one or more facial features of the individual's image 104 may be simulated so that character 102 has lifelike expressions and/or mannerism, which may enhance the appearance or believability of the individual performing the song with the musical artist 120. For example, the eyes, mouth, chin, brow, and the like of the individual's image 104 may be graphically adjusted so that these features move in accordance with normal facial movements. For example, the eyes of the individual's image may be graphically modified to appear as if they blink and the mouth may be graphically modified so that it moves in synchronization with the song lyrics to appear as if the user is singing the song.

The facial features of the individual's image 104 may be overlaid atop the facial region of the character 102 such that the facial features appear to have various depth. For example, the nose may appear to be in front of the eyes, chin, cheeks, and the like as in a normal human face. The eyes, lips, cheeks, chin, and the like may also appear to have proper depth in relation to other features of the face. In this manner, the individual's image 104 may be overlaid to provide a more three dimensional appearance, which enhances the appearance and/or believability of the individual performing the song on set or in studio with the musical artist 120. The musical artist 120 and setting or studio 110 may likewise have appropriate depth characteristics to provide a lifelike three dimensional appearance and feel.

The image 104 may be checked (e.g., via facial recognition programs) to ensure that the image is of a face and not some other body part or something else. For example, the image may be checked for various facial features (e.g., eyes, nose, mouth, and the like) to ensure that they are present and that the image is, thus, of a face. The image and/or various facial features may also be checked so that the image may be properly sized and/or aligned with the facial region of the character 102. The image may further be checked so that the image may be properly blended with the facial region of the character 102 and/or so that the skin tone and/or color of the character 102 may be matched with the image. In one embodiment, matching the skin tone and/or color of the character 102 with the image involves darkening or lightening the character 102 so as to closely match the skin tone and/or color of the image. In another embodiment, the character 102 is initially darkened or lightened to a degree that will approximate or match a majority of individual's skin tone and/or color.

A recording of the individual singing the song may be provided and synchronized with the video segment so that the individual's voice is audible as the electronic message 100 is being played. Electronic message 100 may thus, provide both a visual and audio appearance of the individual performing the song alongside the musical artist 120. Synchronizing an audio recording of the individual singing the song enhances the believability of the electronic message 100. The simulated movement of the lips of the individual's image (e.g., the graphical adjustment of the lips) may be synchronized with the individual's audio recording so that the appearance of the individual singing the song is further enhanced. Various parameters of the individual's audio recording, such as the volume, tone, pitch, and the like, may be adjusted, either manually or automatically, to further enhance the believability of the electronic message 100 and/or to suite a user's needs. For example, the tone and/or pitch may be adjusted to be in tune with the song and the volume may be adjusted (either of the individual, the musical artist, the music, or any combination thereof) so that the individual is the predominant singer, a backup singer, and the like.

Although video segment 100 is depicted as a music video in FIG. 1, in other embodiments video segment 100 includes a portion of a movie, television episode, commercial, video game, and the like, having one or more actors, video game heroes, and the like in place of musical artist 120 so that video segment 100 has the appearance of the character 102 acting in the movie, television episode, commercial, video game, and the like, alongside the one or more actors, video game heroes, and the like. The individual may optionally record themselves performing a scene or clip of the movie, television, commercial, or video game, which recording may be synchronized with the video segment, and an electronic message may be generated from video segment 100 involving the movie, television, commercial, or video game clips in a manner similar to that described herein and subsequently sent to a recipient as part of a funds transfer notification, special occasion, randomly, and the like.

Referring now to FIGS. 2A-2G, illustrated are various screenshots of a process for generating an electronic message from a video segment where the electronic message has the appearance of an individual performing a song with a musical artist. The screen shots may be from an electronic message generator program that is hosted on a website, kiosk, computer, server, application (e.g., smart phone or tablet application), and the like. The electronic message generator may modify video segments as described herein to generate the electronic message.

Screen shot 200a of FIG. 2A shows an initial screen where a music track or video segment is selected by a user, such as a sender of the electronic message. Specifically, screenshot 200a shows eight video segments (two per artist) that may be selected from among four musical artists (i.e., artists 202a, 202b, 202c, and 202d). The process may include more or less video segments from a variety of different artists or musical artists. As described in FIG. 1, the video segment typically includes a song, a musical artist performing the song, and/or a character that may be graphically modified performing the song with the musical artist. Screenshots 200a has a video viewing portion or region that displays the video segment currently selected. The user may select a desired video segment from which to generate an electronic message by selecting button 210. The various screens shown in FIGS. 2A-2G may additionally have help messages, such as message 256 shown in FIG. 2G, that appear onscreen to guide the user through the electronic message generation process. The messages may appear over or near various buttons that need to be selected to perform the next sequential operation in the message generation process.

Figure 2B:
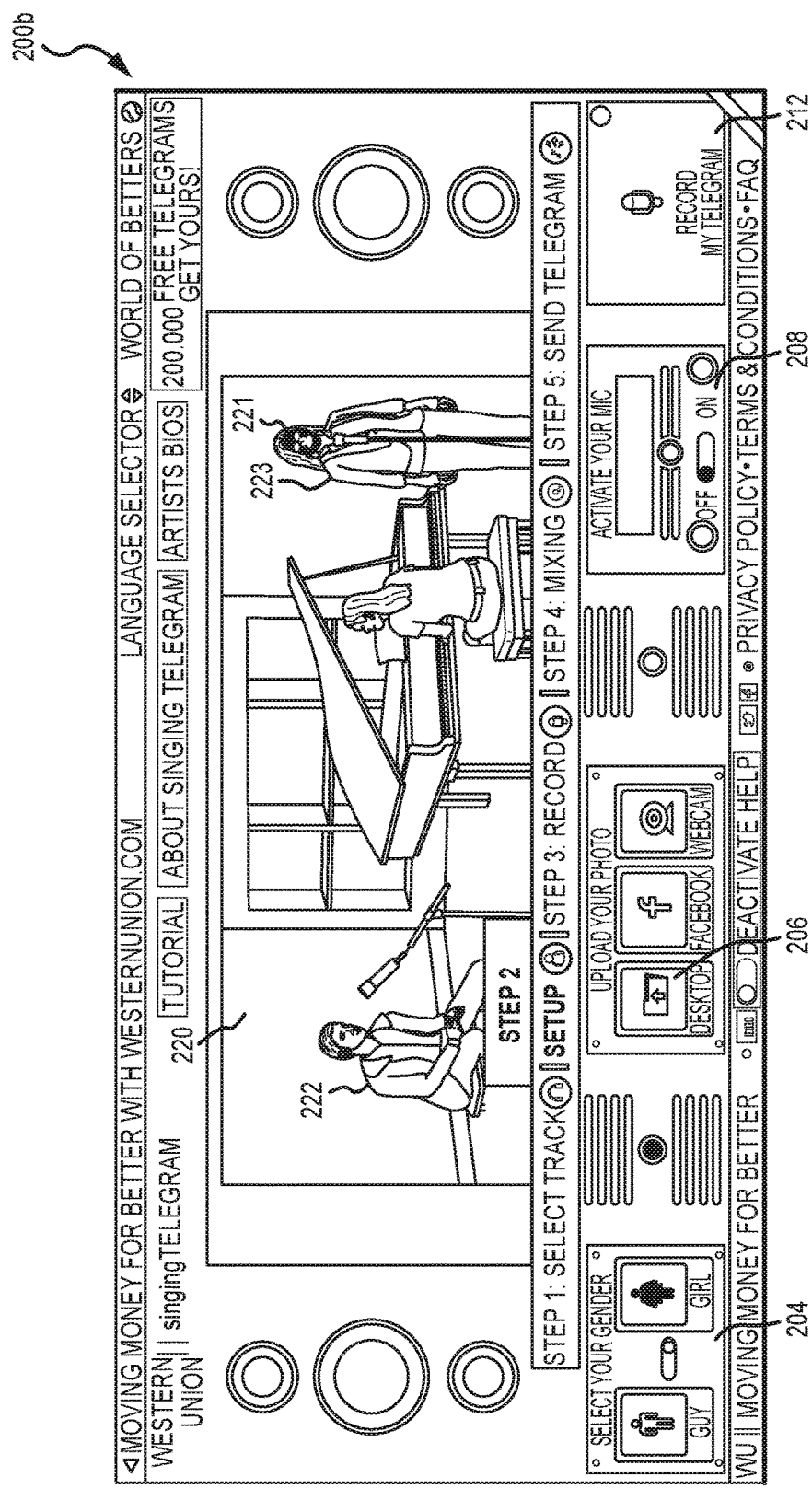
Figure 2C:
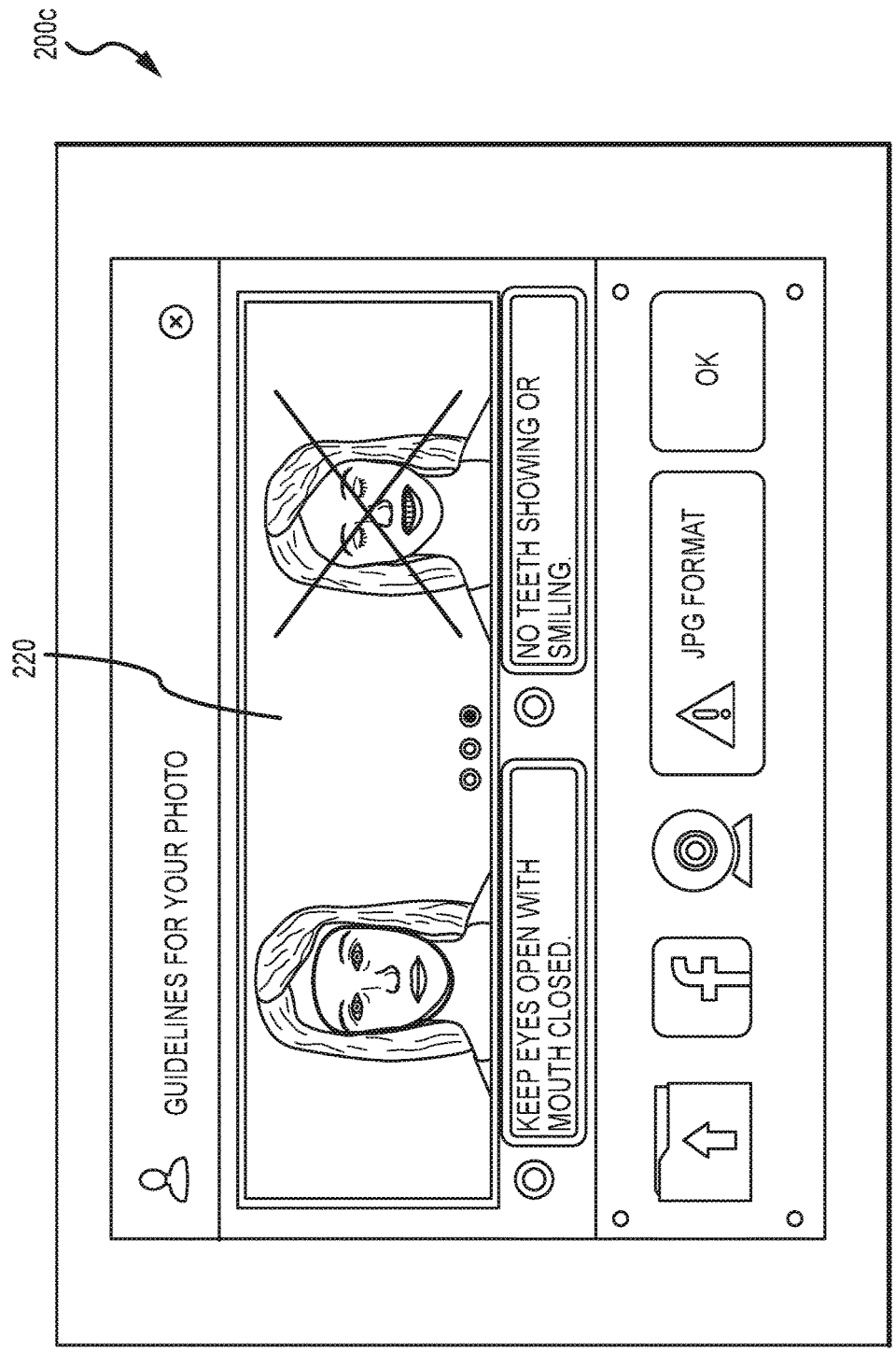

Screenshot 200b of FIG. 2B shows a setup screen that may be displayed in response to the user selecting button 210. In the setup screen, the user may be able to select a gender 204 of the character 223 that will be displayed performing with the musical artist in the electronic message. The setup screen may also have a one or more buttons that allow the user to upload an image 206 to the electronic message generator (e.g., to a website hosting the electronic message generator) or capture an image that is provided to the electronic message generator. For example, screenshot 200b specifically shows that an image may be upload from a file on a computer (e.g., from the computer's desktop), from a social media or other online account (e.g., Facebook®), and/or captured using a webcam. The setup screen may also have one or more buttons that allow a microphone to be activated 208 and/or adjusted to record the user or another individual singing the song featured in the video segment. A record button 212 may be used to begin, pause, and/or stop an audio recording of the user or other individual signing the song. Video viewing region 220 may show the video segment selected by the user, such as by showing the musical artist 222 performing the song. A character 223 may be displayed alongside the musical artist 222 so that the character 223 appears to be performing the song with the musical artist 222. A facial area or region 221 of the character may be darkened to show where the individual's image is to be overlaid atop, or otherwise with respect to, the character. Facial features, such as the eyes, nose, mouth, and the like, of the facial area or region 221 may be highlighted to give the user an idea of how the image will look. The character 223 shown in video viewing region 220 may be determined based on the gender 204 selected by the user.

Screenshot 200c shows an upload image screen that instructs the user on uploading the image to the electronic message generator. Video viewing region 220 may graphically illustrate what is an acceptable image for uploading (e.g., an individual looking forward with eyes open and mouth closed) and what is not an acceptable image for uploading (e.g., an individual with the head tilted or turned, eyes closed, mouth open, teeth showing, and the like). The upload image screen may further display acceptable image file formats (e.g., JPG) and/or have one or more buttons that allow the user to upload an image from various sources, such as from a file on a computers, social or online media or profile, webcam or other image capture device, and the like.

The image uploaded by the user may be checked or verified to ensure that the image is of an individual's face and not some other body part or of some other object. This may ensure that the generated electronic message is not embarrassing to the musical artist that is featured alongside the individual, to the sender of the electronic message, and/or to the entity providing electronic message generation services. Checking or verifying the image may include recognizing facial features of the image such as the eyes, mouth, nose, cheeks, chin, and the like. The image may also be checked to ensure that it is of sufficient quality, file format, and/or meets the standards defined in the upload image screen. For example, the image may be checked to determine if the individual's head is tilted or turned, if the eyes are closed, if the mouth is opened and/or the teeth are showing, and the like. The user may be notified of any potential problems with the image (i.e., the eyes are closed or not detected, the mouth is open or teeth are showing, the head is turned, and the like) and a replacement or alternate image may be requested.

The image may further be checked or recognized so that the image may be properly aligned with and overlaid atop the facial region of the character 223 featured in the video segment, and/or so that the image may be properly blended with the character's face. The image may then be aligned with and overlaid atop the facial region of the character 223. The image may be graphically adjusted or modified to provide depth for the various facial features, such as the eyes, nose, cheeks, chin, and the like. The image may be further graphically adjusted or modified so that a portion of the individual's face is darkened corresponding to a theoretically shadow that would be produced from one or more light sources if the individual were on set or in studio with the musical artist. In other words, the shadows cast by both the musical artist and the individual's overlaid image may appear to correspond to the same light source on set or in studio, thereby increasing the visual appearance and believability of the individual performing the song on set or in studio with the musical artist. The skin tone and/or color of the character 223 may also be modified or adjusted based on the uploaded image so that the character and the image match. As previously described, matching the skin tone and/or color of the character 223 with the image may involve darkening or lightening the character 223 to approximate the skin tone and/or color of the image, or may involve initially darkening or lightening character 223 to a degree that will approximate a majority of individual's skin tone and/or color.

After uploading an acceptable image, the user may be redirected back to the setup screen as shown in screenshot 200*d*. Video viewing region 220 may now show the musical artist 222 alongside the character 223 featured in the video segment with the uploaded image of the individual's face 224 aligned with and overlaid atop the facial region of the character 223. The user may view the video segment with the character 223 and overlaid facial image 224 to determine if the user is satisfied with the video segment thus far. If the user is not satisfied, the process shown in screenshots 200*a*-200*d*, or any portion thereof, may be repeated until the user is satisfied. The user may then optionally adjust one or more parameters of a microphone 208 in order to begin a recording process where the user or another individual will be recorded singing the song featured in the video segment. Alternatively, the user may upload a previous recording of the user or another individual singing the song. For example, in one embodiment, a microphone button 208 may be selected to select a source of the sound for the audio recording of the user (e.g., a microphone), and/or may be selected to set a volume for the recording. Record button 212 may then be selected to begin the recording process or, alternatively, a previous recording may be uploaded.

Figure 2D:
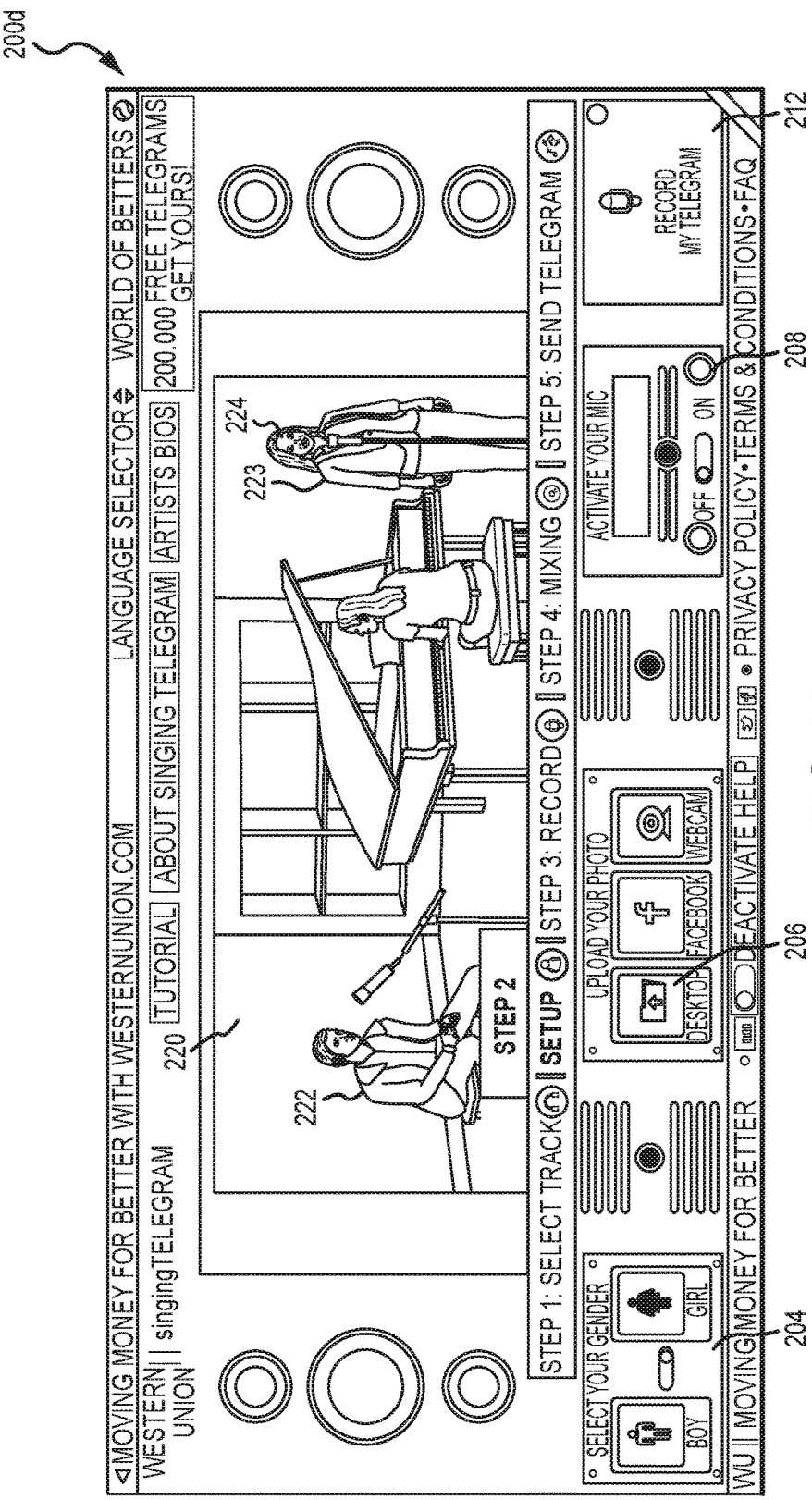
Figure 2E:
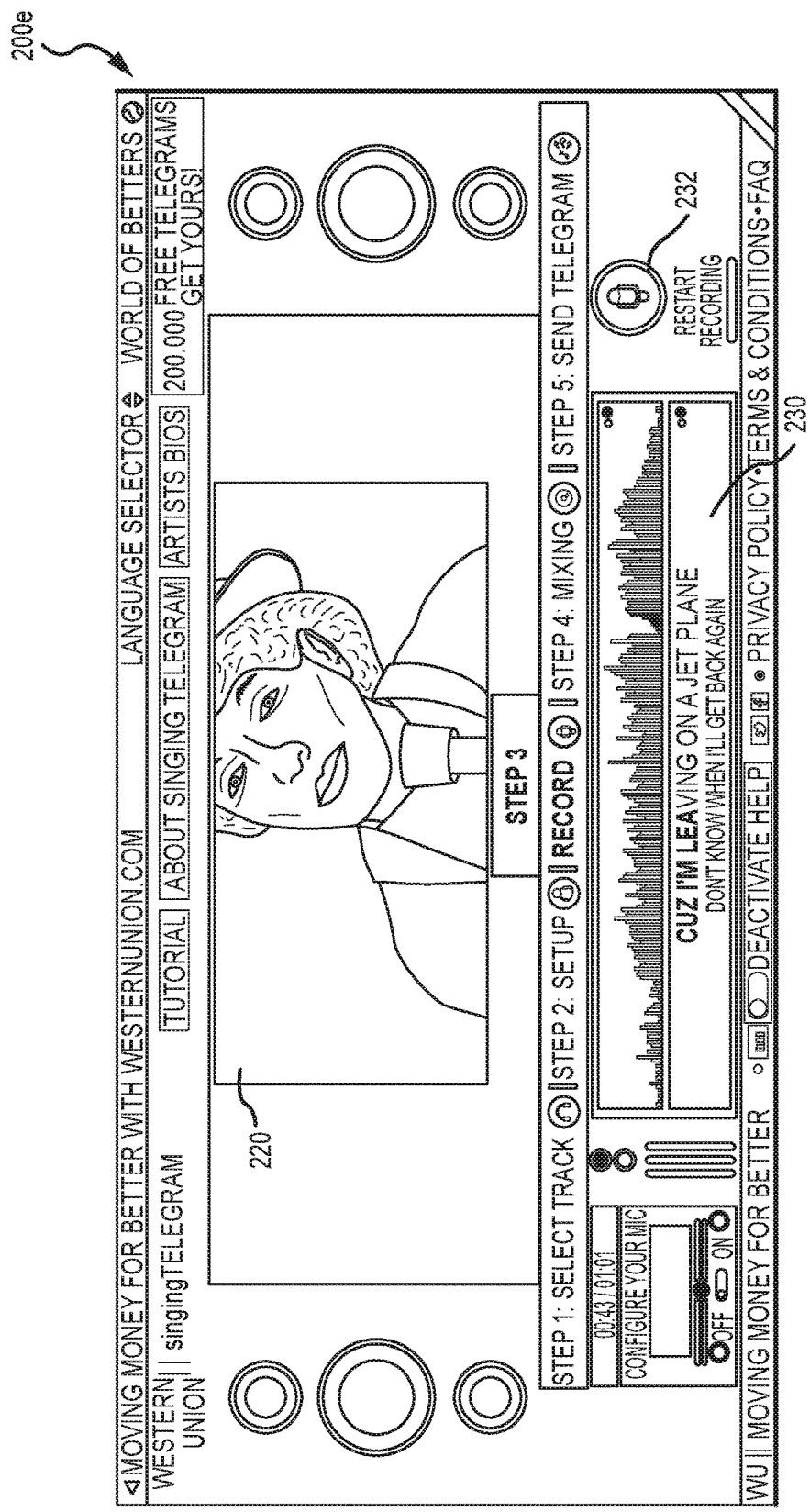

Screenshot 200*e* of FIG. 2E shows a recording screen that may be displayed in response to the user selecting recording button 212. Recording screen 200*e* may be displayed if the user chooses to record themselves or another individual singing the song. Recording screen 200*e* is optional and may be skipped if the user uploads a pre-recorded song or chooses not to include an individualized recording in the electronic message. During recording, video viewing region 220 may display the musical artist 222 and/or character 223 (and optionally the overlaid image) performing the song. This may help the user or individual sing the song by providing both audio and visual stimulation. In other embodiments, the musical artist is not displayed singing the song. The lyrics of the song may be displayed in a lyric region 230 of recording screen 200*e* to help the user in singing the song. The lyrics may be highlighted to display which lyrics have been sung and which lyrics are upcoming. The highlighter may scroll across the lyrics to show the user which lyrics are currently being sung. The audio recording process may be started, stopped, paused, and/or redone by selecting an appropriate button, such as start/restart recording button 232.

Figure 2F:
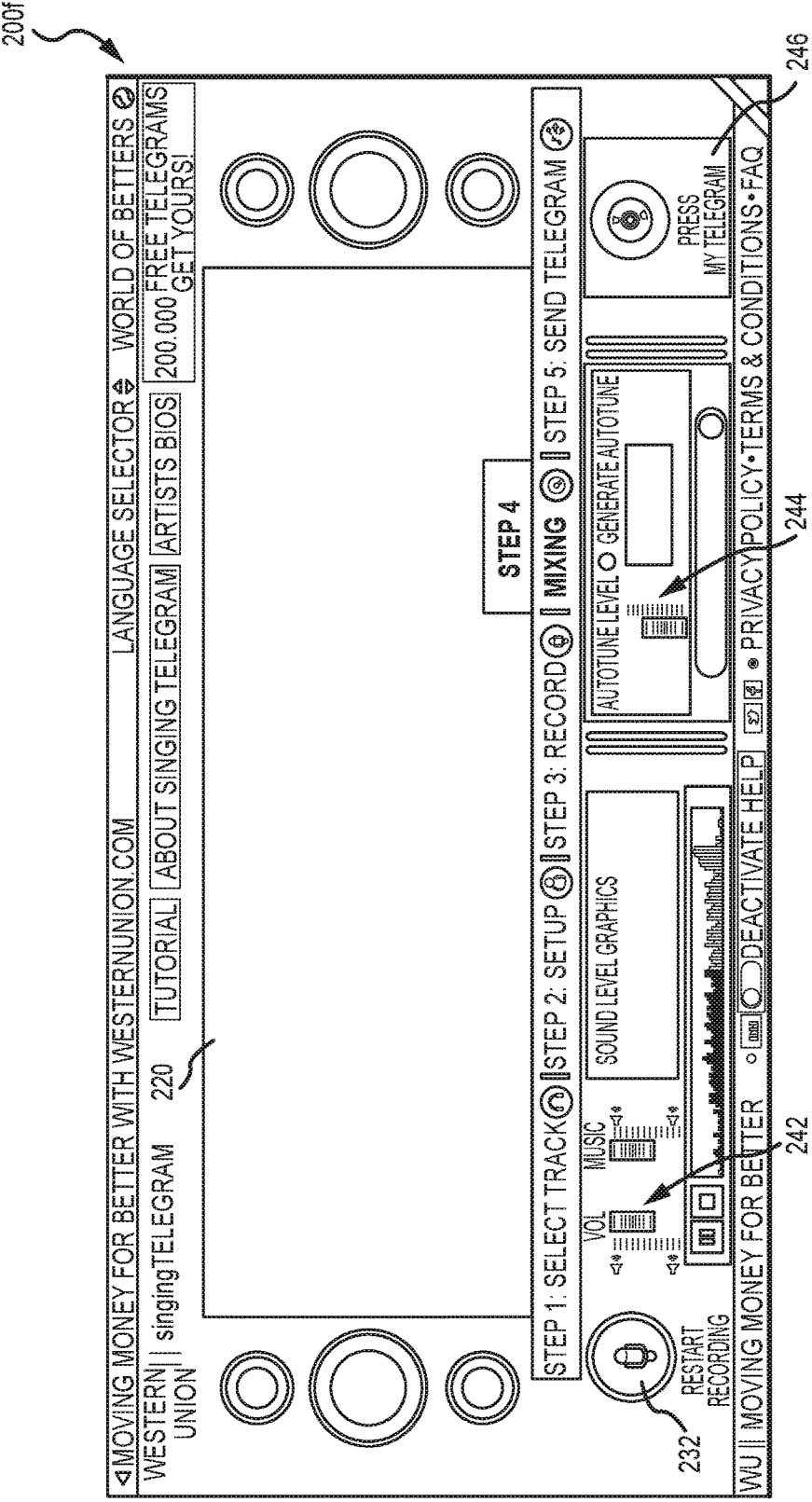

After the recording process is complete, a mixing screen shown in screenshot 200*f* of FIG. 2F may be displayed. Mixing screen 200*f* may allow the user to modify or adjust one or more parameters of the recording to fit or correspond to the musical artist's rendition of the song, or for various other purposes. For example, the pitch and/or tone of the user's recording may be adjusted or modified so that the user is "in tune" with the musical artist and/or the background music. The volume of the user's recording in relation to the volume of the musical artist and/or background music may also be adjusted or modified so that the user sounds like the lead singer and/or a backup singer. In some embodiments, the speed or tempo of the user's singing may also be adjusted (e.g., sped up or slowed down) to properly correspond with the speed or tempo of the musical artist's singing.

Adjustment of these parameters may be performed manually via user controls or buttons 242, may be adjusted automatically by the electronic message generator, or may be adjusted semi-automatically by the user and electronic message generator via input from user button 244. Start/restart recording button 232 may be displayed on mixing screen 200*f* in case the user is unsatisfied with the recording and wants to rerecord the song. A recipient information button 246 may also be displayed that the user can select when mixing is complete and the user is ready to input information about a recipient of the electronic message.

Figure 2G:
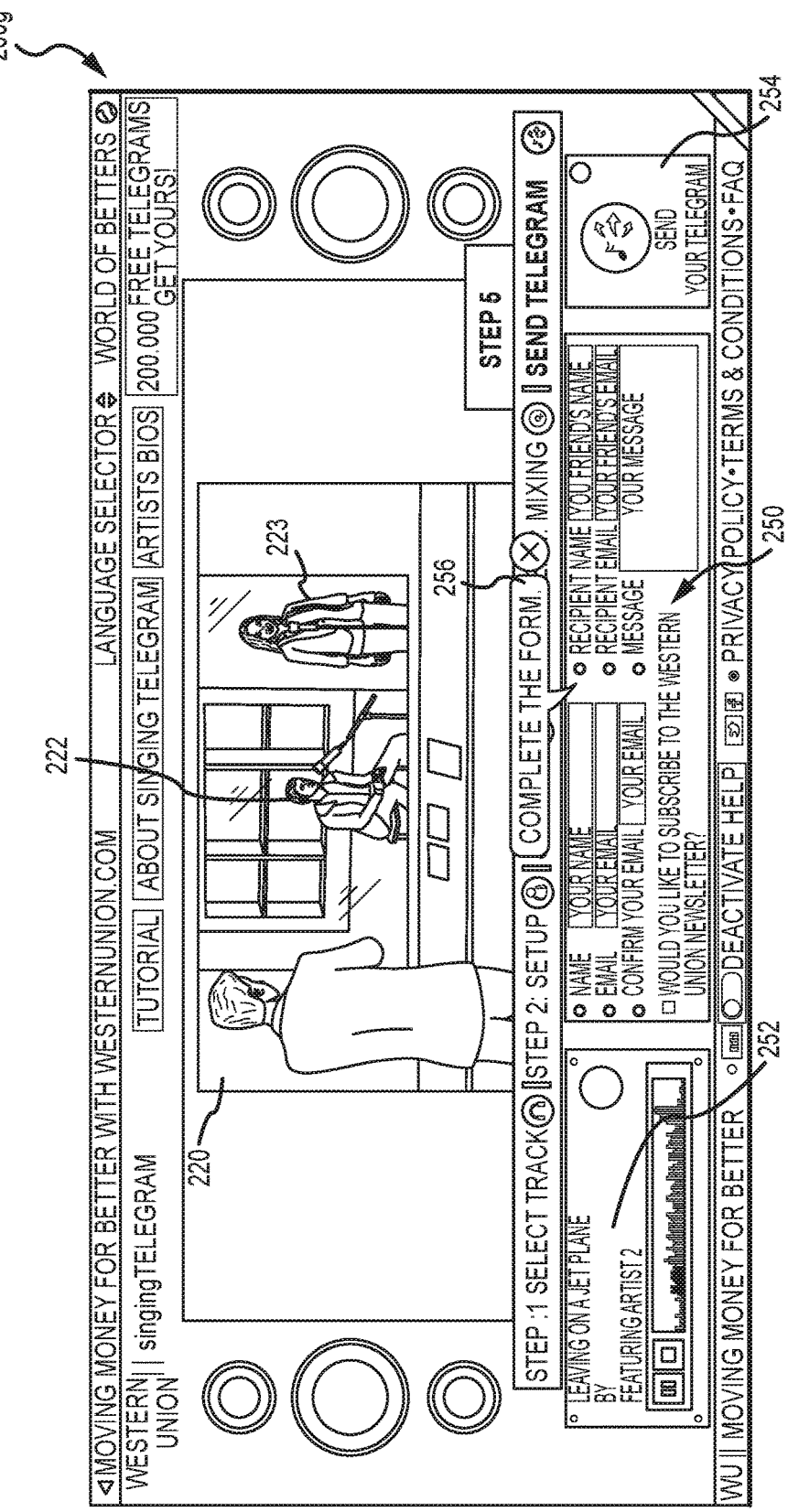

Screenshot 200*g* of FIG. 2G shows a recipient information input screen where the user (e.g., a sender of the electronic message) can enter information about the recipient of the electronic message. Video viewing region 220 may display the musical artist 222 performing the song with the character 223. Various messages 256 may also appear to guide the user as previously described. A song display region 252 may display the title of the song performed in the video segment and also display the user's name and the name of the musical artist. The display may show the song as being by the user and featuring the musical artist so as to appear as a music video of the user that features the musical artist.

Recipient information input screen 200*g* may include an input area 250 where the user can input the user's and/or recipient's information, such as the user and/or recipient's name, email address, phone number, social media account information, and the like. The entered recipient information may instruct the electronic message generator as to where to send the electronic message (e.g., an email account, wireless device, social media account, and the like). The user may also input one or more messages to include with the video segment, such as Happy Birthday!, Congratulations on Graduating, and the like. The recipient information input screen 200*g*, or any of the previous screens, may have a payment button where the user is able to input payment information to pay for the electronic message generation services.

In a specific embodiment, the user may also enter information about a pending funds transfer transaction, such as by inputting a funds transaction identifier that the recipient may use to receive funds transferred by the user. In another embodiment, the user may stage a funds transfer by entering the recipient's information and inputting account information from which to receiving and/or transfer funds. For example, the user may enter information about an account where funds are to be received or withdrawn, such as a bank account, checking account, savings account, credit/debit card account, prepaid card account, mobile wallet account, and the like. The user may enter similar information for an account of the recipient where funds will be directed and/or deposited, such as any of the aforementioned accounts. In another embodiment, the user does not enter recipient account information so that the recipient is able to determine or direct where the funds are transferred and how the funds are received (e.g., received via deposit, cash, money order, check, and the like). After this information is received, the electronic message generator may stage the funds transfer transaction and receive and transfer the funds from the user to the recipient.

In yet another embodiment, the user may stage the funds transfer transaction prior to generating the electronic message. For example, the user may stage the funds transfer transaction via one or more systems of a funds transfer provider, such as by accessing a website of the funds transfer provider, visiting an agent location of the funds transfer provider, accessing a funds transfer kiosk, swiping or using a funds transfer card at a retail or other location, and the like. The user may be provided with a transaction identifier in response to staging the funds transfer transaction and/or may be provided with a link (e.g., web link) to a site hosting or providing the electronic message generation services. The transaction identifier may be input into any of the previously described screens 200*ag* to associate the electronic message with the staged funds transfer transaction and/or to satisfy a payment requirement for using the electronic message generation services. Inputting the transaction identifier may cause the input area 250 to be automatically populated with some or all of the recipient's and/or sender's information since this information may have been previously provided to the funds transfer provided during the funds transfer transaction staging process.

After the user has entered the necessary information, the user may select a transmit message button 254 to generate and/or send the electronic message to the recipient. The electronic message, and/or funds transfer information, may be transmitted to the recipient based on the recipient information input into input area 250, such as to an email address, wireless device, social media account, website of the recipient, and the like. The electronic message may notify the recipient of the pending funds transfer and/or provide the transaction identifier. The electronic message may additionally or alternatively include any other message or notification, such as a birthday message, celebration message, and the like.

Generating the electronic message may include overlaying the image of the individual's face onto the facial area of the character, although in some embodiments this overlayment process is previously performed as described above. In one embodiment, a first overlayment process is performed to give the user a rough idea of how the overlaid image will appear on the character as shown in FIG. 2D. If the user is satisfied with the appearance of the image, a second overlayment process may be performed to add enhanced facial feature depth, smoothness, blending, and the like to the overlaid image, thus, increasing the appearance and believability of the overlaid image.

Generating the electronic message may also include simulating movement of one or more facial features of the overlaid image to provide lifelike facial expressions for the character. For example, the eyes and/or mouth of the overlaid image may be graphically adjusted or modified to simulate movement of these facial features so as to make the overlaid image appear to be singing the song and/or to provide other lifelike facial expressions, features, and/or mannerisms. The cheeks may also be graphically adjusted or modified, and/or the head and overlaid image may be tilted, twisted, rotated, and the like so as to appear like the user is dancing to and/or singing the song. Generating the electronic message may further include synchronizing the recording of the individual signing the song with the simulated movement of the facial features of the overlaid image to provide a more believable and lifelike appearance of the individual signing the song. For example, the individual's song recording can be synchronized with the simulated movement of the lips so that the mouth opens and closes in proper relation to the song's lyrics and timing of the singing. Generating the electronic message may additionally include graphically adjusting or modifying a portion of the individual's face so that the portion is darkened in relation to the remainder of the facial image. The face may thus appear to be casting a shadow from one or more light sources of the displayed set or studio. The darkened portion of the facial image may be adjusted in relation to the character's head as the character's head and the overlaid image twist, turn, and/or rotate while performing the song so as to appear to be casting a shadow from the set or studio's light source(s). Generating the electronic message in this manner results in a lifelike appearance of the individual performing the song with the musical artist and enhances the believability of the individual performing on set or in studio with the musical artist. The graphical adjustment of the image may occur in a single message generation process or may occur in multiple message generation process as described above.

Although the electronic message generation process is described after FIGS. 2A-2G, the generation process could be performed in between any of the various screenshots, such as after the mixing screen and prior to the recipient information input screen.

Figure 3:
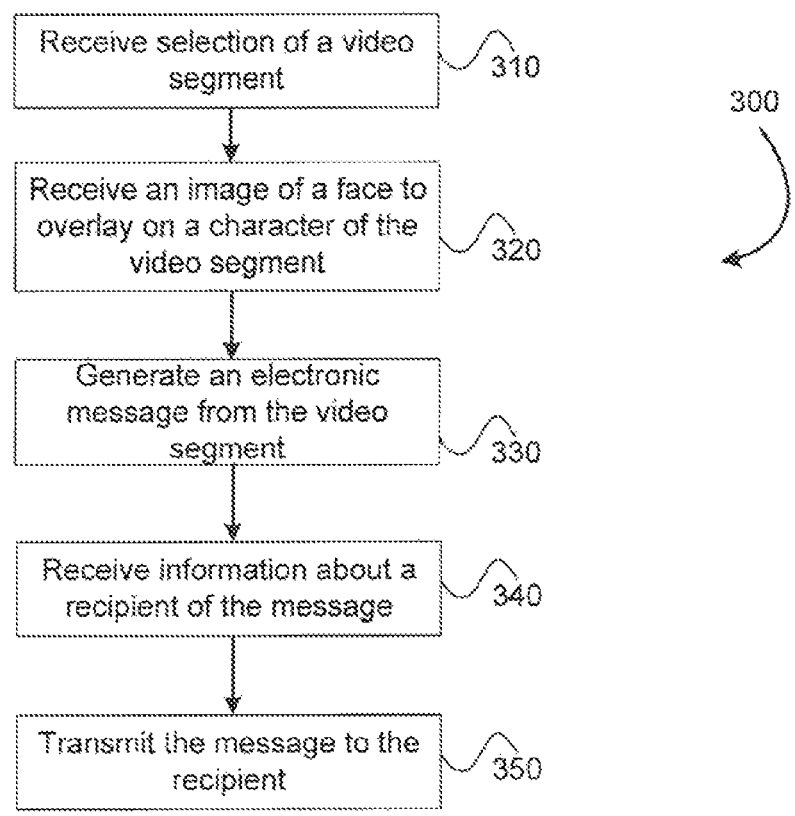
FIG. 3 illustrates an embodiment of a method of generating an electronic message having the appearance of an individual performing a song with a musical artist.

Referring now to FIG. 3, illustrated is a method 300 of generating an electronic message having the appearance of an individual (e.g., a sender or recipient of the message) performing with a musical artist. At block 310, a selection of a video segment is received from the user. As described above, the video segment includes a song, a musical artist that performs the song, and a character that performs the song with the musical artist. In other embodiments, the video segment could include a movie clip, television clip, or clip of a commercial or video game that includes an actor and a character performing a scene with the actor.

At block 320, an image of a face to overlay on the character of the video segment is received from the user. At block 330, the electronic message is generated from the video segment such as by overlaying the image on the character and/or simulating movement of one or more facial feature of the image. At block 340, information about a recipient of the electronic message is received from the user. The information may include a name of the recipient, and/or address or location to send the message (e.g., email address, wireless device address, website, social media account information, and the like). At block 350, the electronic message is transmitted to the recipient based on the information received from the user.

Figure 4:
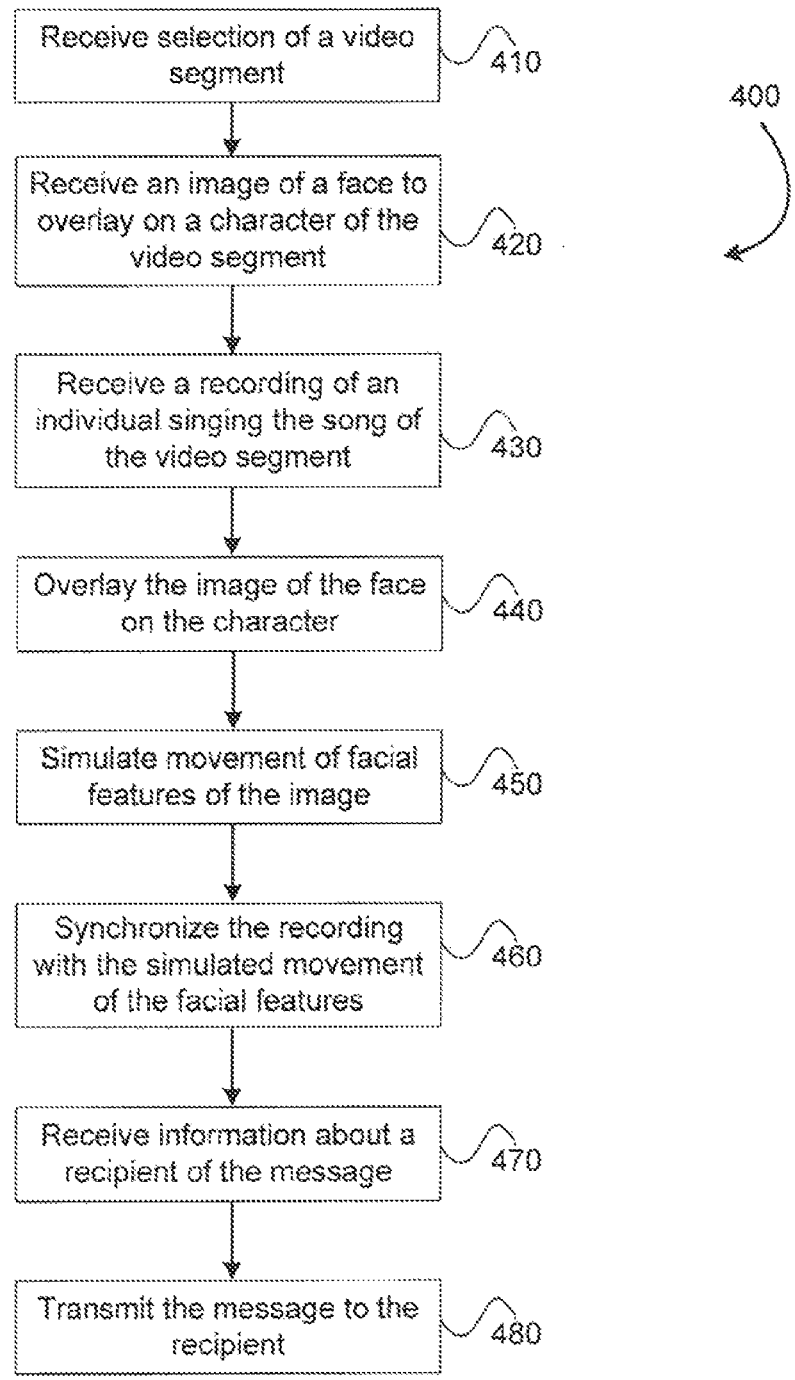
FIG. 4 illustrates another embodiment of a method of generating an electronic message having the appearance of an individual performing a song with a musical artist.

Referring now to FIG. 4, illustrated is another method 400 of generating an electronic message having the appearance of an individual performing a song with a musical artist. Blocks 410 and 420 are similar to blocks 310 and 320 of FIG. 3 where a selection of a video segment and an image to overlay on a character of the video segment is received from a user. At block 430, a recording of an individual singing the song of the selected video segment is received. The recording may be pre-recorded and uploaded by the user or may be recorded during the electronic message generation process as described herein. At block 440, the image is overlaid on the character of the video segment. At block 450, the image is graphically adjusted to simulate movement of one or more facial features to enhance the appearance and/or believability of the individual performing the song with the musical artist. At block 460, the recording of the individual signing the song is synchronized with the simulated movement of the facial features to further enhance the appearance and/or believability of the individual performing the song with the musical artist. Blocks 470 and 480 are similar to blocks 340 and 350 of FIG. 3 where recipient information is received from the user and the electronic message is transmitted to the recipient.

Figure 5:
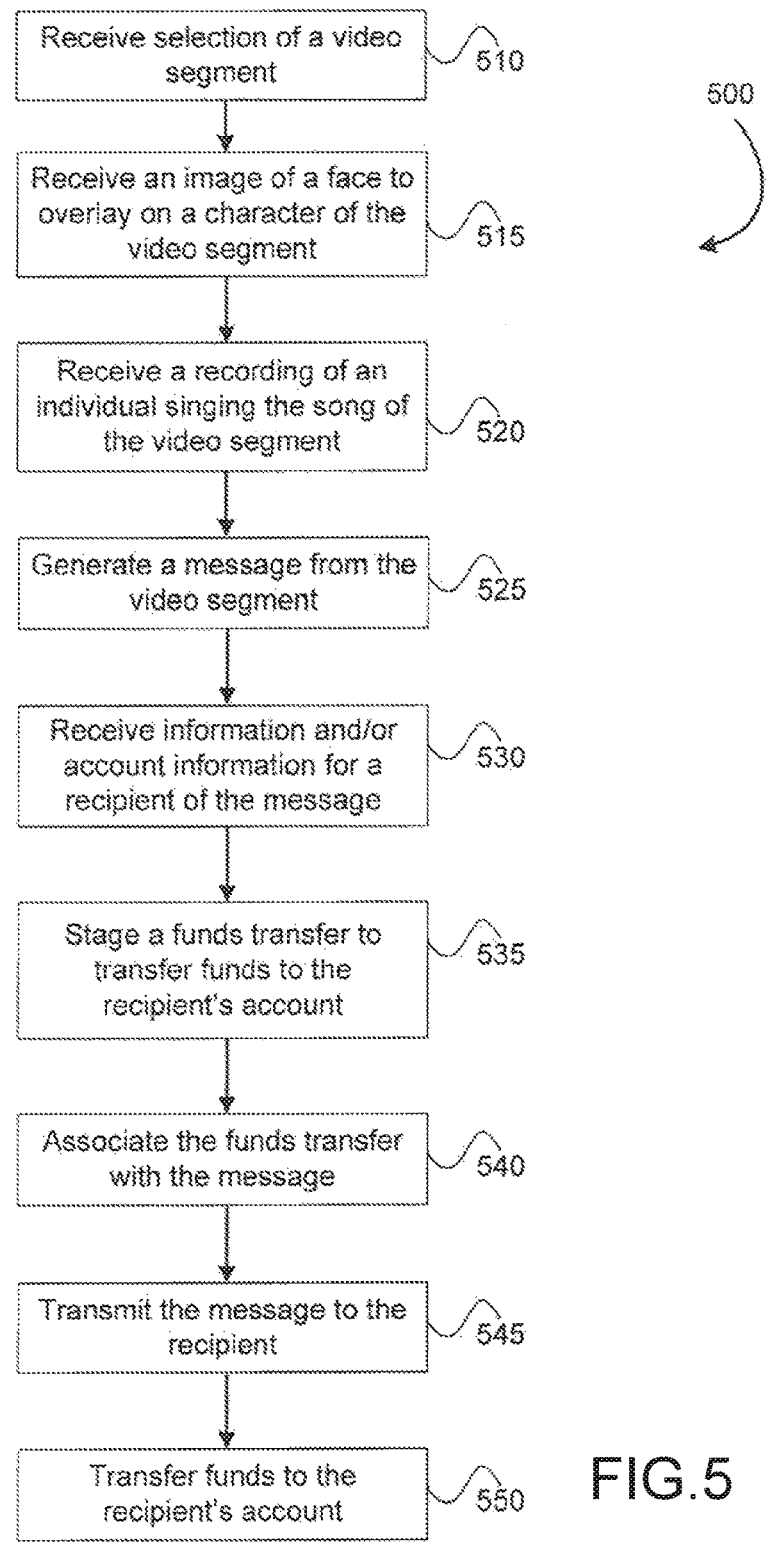
FIG. 5 illustrates an embodiment of a method of generating an electronic message and associating the electronic message with a funds transfer transaction.

Referring now to FIG. 5, illustrated is a method 500 of generating an electronic message, similar to FIGS. 3 and 4, and associating the electronic message with a funds transfer. Block 510, 515, and 520 are similar to block 410, 420, and 430, where a selection of a video segment, an image to overlay on a character of the video segment, and a recording of an individual singing the video segment's song is received from a user. Block 520, is optional, however, as the electronic message may be generated without the recording of the individual singing the song.

At block 525, the electronic message is generated from the video segment as described herein. At block 530, information is received about the recipient of the electronic message and the funds transfer transaction. In one embodiment, the recipient information received may include information about an account that will receive the transferred funds, such as the recipient's bank account, checking account, savings account, credit card account, mobile wallet account, and the like. In another embodiment, the recipient information does not include account information so that the recipient may direct a funds transfer provided as to where to transfer the funds and/or how the funds are received, which may include anyone of the aforementioned accounts or may include receiving the funds in cash in person at an agent location of the funds transfer provider, receiving a check or money order, and the like. In another embodiment, the user may also provide information about an account from which the funds transfer provider is to withdraw or receive the funds, such as any of the aforementioned accounts. The sender may alternatively provide the funds to an agent of the funds transfer provider, such as via cash, check, money order, credit/debit card, mobile wallet, and the like.

Regardless of how the funds are to be received and/or transferred, a funds transfer transaction may be staged at block 535 to transfer the funds to the recipient. In one embodiment, a transaction identifier is provided to the user in response to the funds transfer transaction staging process. At block 540, the funds transfer transaction may be associated with the electronic message, such as by receiving the transaction identifier from the user. At block 545, the electronic message is transmitted to the recipient based on the recipient information received from the user. At block 550, the funds of the funds transfer transaction may be transferred to the recipient, such as by transferring the funds to one or more of the aforementioned accounts or providing the funds to the recipient via an agent of the funds transfer provider. In one embodiment, the funds transfer provider is an entity the provides both the described funds transfer services and the describe electronic message generation services.

Figure 6:
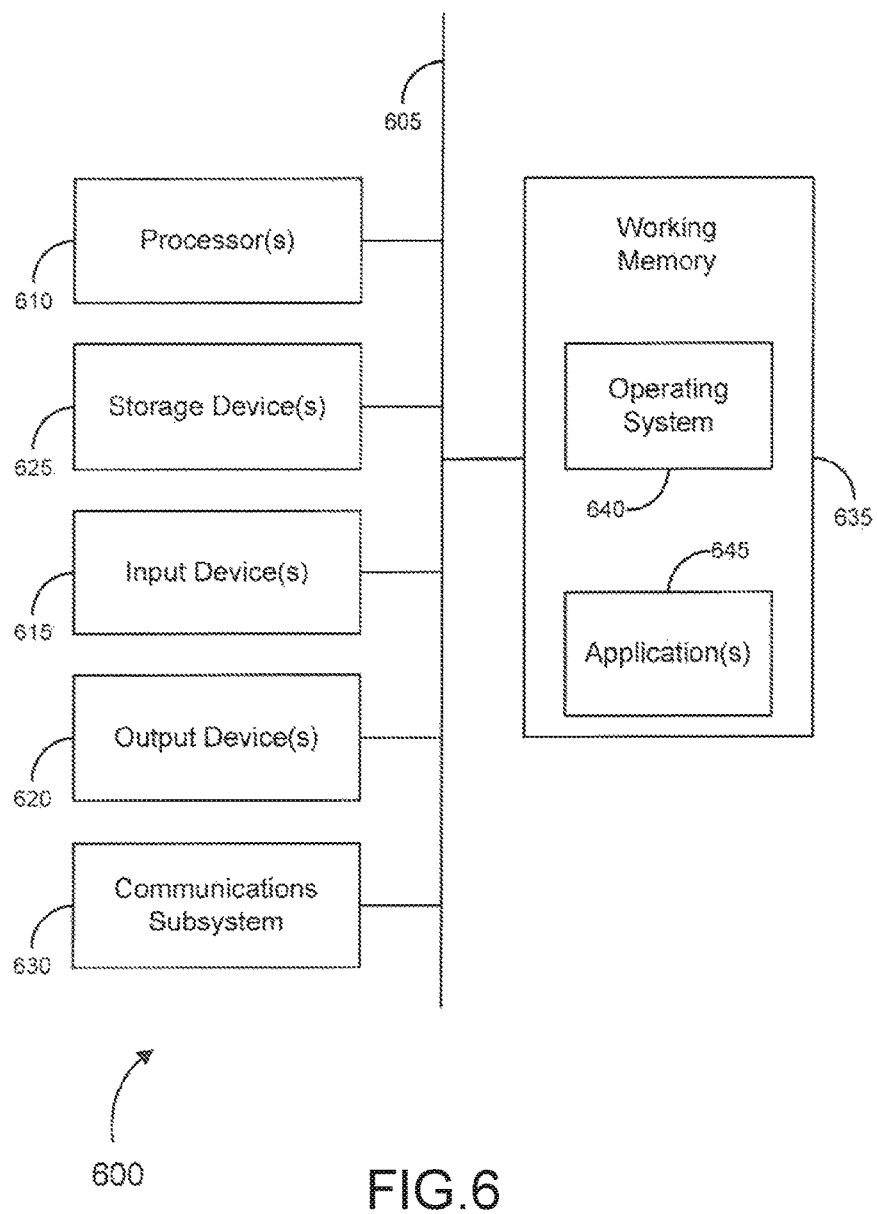
FIG. 6 illustrates an exemplary computer system that may be used to perform the methods described herein and/or that may host an electronic message generation application.

Referring now to FIG. 6, illustrated is a schematic of one embodiment of a computer system 600 that can perform the methods of the invention, as described herein, and/or can function as, for example, the electronic message generation system or a system hosting an electronic message generation application. It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605 (or may otherwise be in communication, as appropriate). The hardware elements can include one or more processors 610, including, without limitation, one or more general-purpose processors and/or one or more special-purpose processors (such as digital signal processing chips, graphics acceleration chips, and/or the like); one or more input devices 615, which can include, without limitation, a mouse, a keyboard and/or the like; and one or more output devices 620, which can include, without limitation, a display device, a printer and/or the like.

The computer system 600 may further include (and/or be in communication with) one or more storage devices 625, which can comprise, without limitation, local and/or network accessible storage and/or can include, without limitation, a disk drive, a drive array, an optical storage device, a solid-state storage device, such as a random access memory ("RAM") and/or a read-only memory ("ROM"), which can be programmable, flash-updateable and/or the like. Computer system 600 might also include a communications subsystem 630, which can include without limitation a modem, a network card (wireless or wired), an infra-red communication device, a wireless communication device and/or chipset (such as a Bluetooth™ device, an 802.11 device, a Wi-Fi device, a WiMax device, cellular communication facilities, etc.), and/or the like. The communications subsystem 630 may permit data to be exchanged with a network (such as the network described below, to name one example), and/or any other devices described herein. In many embodiments, computer system 600 will further comprise a working memory 635, which can include a RAM or ROM device, as described above.

Computer system 600 can also comprise software elements, shown as being currently located within the working memory 635, including an operating system 640 and/or other code, such as one or more application programs 645, which may comprise computer programs of the invention, and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). A set of these instructions and/or code might be stored on a computer readable storage medium, such as the storage device(s) 625 described above. In some cases, the storage medium might be incorporated within a computer system, such as the system 600. In other embodiments, the storage medium might be separate from a computer system (e.g., a removable medium, such as a compact disc, etc.), and or provided in an installation package, such that the storage medium can be used to program a general purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection with other computing devices such as network input/output devices may be employed.

In one aspect, the invention employs a computer system (such as the computer system 600) to perform methods of the invention. According to a set of embodiments, some or all of the procedures of such methods are performed by the computer system 600 in response to processor 610 executing one or more sequences of one or more instructions (which might be incorporated into the operating system 640 and/or other code, such as an application program 645) contained in the working memory 635. Such instructions may be read into the working memory 635 from another machine-readable medium, such as one or more of the storage device(s) 625. Merely by way of example, execution of the sequences of instructions contained in the working memory 635 might cause the processor(s) 610 to perform one or more procedures of the methods described herein.

The terms "machine-readable medium" and "computer readable medium", as used herein, refer to any medium that participates in providing data that causes a machine to operate in a specific fashion. In an embodiment implemented using the computer system 600, various machine-readable media might be involved in providing instructions/code to processor(s) 610 for execution and/or might be used to store and/or carry such instructions/code (e.g., as signals). In many implementations, a computer readable medium is a physical and/or tangible storage medium. Such a medium may take many forms, including but not limited to, non-volatile media, volatile media, and transmission media. Non-volatile media includes, for example, optical or magnetic disks, such as the storage device(s) 625. Volatile media includes, without limitation, dynamic memory, such as the working memory 635. Transmission media includes coaxial cables, copper wire and fiber optics, including the wires that comprise the bus 605, as well as the various components of the communication subsystem 630 (and/or the media by which the communications subsystem 630 provides communication with other devices). Hence, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 600. These signals, which might be in the form of electromagnetic signals, acoustic signals, optical signals and/or the like, are all examples of carrier waves on which instructions can be encoded, in accordance with various embodiments of the invention.

The communications subsystem 630 (and/or components thereof) generally will receive the signals, and the bus 605 then might carry the signals (and/or the data, instructions, etc., carried by the signals) to the working memory 635, from which the processor(s) 605 retrieves and executes the instructions. The instructions received by the working memory 635 may optionally be stored on a storage device 625 either before or after execution by the processor(s) 610.

Figure 7:
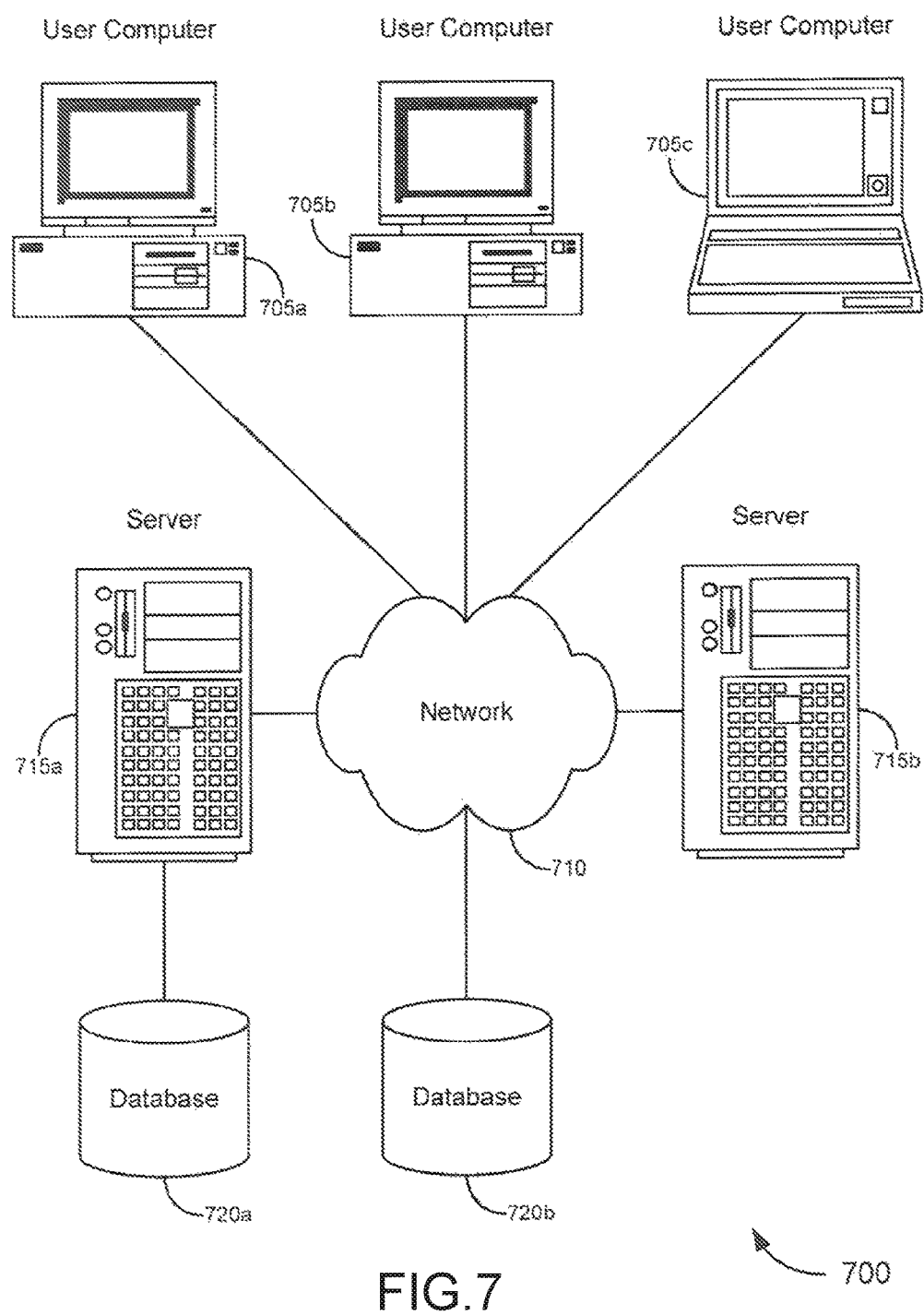
FIG. 7 illustrates an exemplary system that may be used to perform the methods descried herein and/or describes various system components of an electronic message generator and/or funds transfer provider.

A set of embodiments comprises systems for generating electronic messages and/or performing funds transfer transactions. Merely by way of example, FIG. 7 illustrates a schematic diagram of a system 700 that can be used in accordance with one set of embodiments. The system 700 can include one or more user computers 705, which may be used by the described sender, recipient, and the like. The user computers 705 can be general purpose personal computers (including, merely by way of example, personal computers and/or laptop computers running any appropriate flavor of Microsoft Corp.'s Windows™ (e.g., Vista™) and/or Apple Corp.'s Macintosh™ operating systems) and/or workstation computers running any of a variety of commercially-available UNIX™ or UNIX-like operating systems. These user computers 705 can also have any of a variety of applications, including one or more applications configured to perform methods of the invention, as well as one or more office applications, database client and/or server applications, and web browser applications. Alternatively, the user computers 705 can be any other electronic device, such as a thin-client computer, Internet-enabled mobile telephone, and/or personal digital assistant (PDA), capable of communicating via a network (e.g., the network 710 described below) and/or displaying and navigating web pages or other types of electronic documents. Although the exemplary system 700 is shown with three user computers 705, any number of user computers can be supported.

Certain embodiments of the invention operate in a networked environment, which can include a network 710. The network 710 can be any type of network familiar to those skilled in the art that can support data communications using any of a variety of commercially-available protocols, including without limitation TCP/IP, SNA, IPX, AppleTalk, and the like. Merely by way of example, the network 710 can be a local area network ("LAN"), including without limitation an Ethernet network, a Token-Ring network and/or the like; a wide-area network (WAN); a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 715, which may be operated by an entity providing the electronic message generation services and/or funds transfer services, or which may host applications from performing said services. Each of the server computers 715 may be configured with an operating system, including without limitation any of those discussed above, as well as any commercially (or freely) available server operating systems. Each of the servers 715 may also be running one or more applications, which can be configured to provide services (e.g., electronic message generation and/or funds transfer services) to one or more clients 705 (e.g., senders, recipients, and the like) and/or other servers 715.

Merely by way of example, one of the servers 715 may be a web server, which can be used, merely by way of example, to process requests for web pages or other electronic documents and/or information from user computers 705. The web server can also run a variety of server applications, including HTTP servers, FTP servers, CGI servers, database servers, Java™ servers, and the like. In some embodiments of the invention, the web server may be configured to serve web pages (e.g., an electronic message generation web page) that can be operated within a web browser on one or more of the user computers 705 to perform methods of the invention.

The server computers 715, in some embodiments, might include one or more application servers, which can include one or more applications accessible by a client running on one or more of the client computers 705 and/or other servers 715. Merely by way of example, the server(s) 715 can be one or more general purpose computers capable of executing programs or scripts in response to the user computers 705 and/or other servers 715, including without limitation web applications (which might, in some cases, be configured to perform methods of the invention). Merely by way of example, a web application can be implemented as one or more scripts or programs written in any suitable programming language, such as Java™, C, C#™ or C++, and/or any scripting language, such as Perl, Python, or TCL, as well as combinations of any programming/scripting languages. The application server(s) can also include database servers, including without limitation those commercially available from Oracle™, Microsoft™, Sybase™, IBM™ and the like, which can process requests from clients (including, depending on the configuration, database clients, API clients, web browsers, etc.) running on a user computer 705 and/or another server 715. In some embodiments, an application server can create web pages dynamically for displaying the information in accordance with embodiments of the invention, such as the various screens, 200a-200g shown in FIGS. 200A-200G. Data provided by an application server may be formatted as web pages (comprising HTML, Javascript, etc., for example) and/or may be forwarded to a user computer 705 via a web server (as described above, for example). Similarly, a web server might receive web page requests and/or input data from a user computer 705 and/or forward the web page requests and/or input data to an application server. In some cases, a web server may be integrated with an application server.

In accordance with further embodiments, one or more servers 715 can function as a file server and/or can include one or more of the files (e.g., application code, data files, etc.) necessary to implement methods of the invention incorporated by an application running on a user computer 705 and/or another server 715. Alternatively, as those skilled in the art will appreciate, a file server can include all necessary files, allowing such an application to be invoked remotely by a user computer 705 and/or server 715. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 720. The location of the database(s) 720 is discretionary: merely by way of example, a database 720a might reside on a storage medium local to (and/or resident in) a server 715a (and/or a user computer 705). Alternatively, a database 720b can be remote from any or all of the computers 705, 715, so long as the database can be in communication (e.g., via the network 710) with one or more of these. In a particular set of embodiments, a database 720 can reside in a storage-area network ("SAN") familiar to those skilled in the art. (Likewise, any necessary files for performing the functions attributed to the computers 705, 715 can be stored locally on the respective computer and/or remotely, as appropriate.) In one set of embodiments, the database 720 can be a relational database, such as an Oracle™ database, that is adapted to store, update, and retrieve data in response to SQL-formatted commands. The database might be controlled and/or maintained by a database server, as described above, for example.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware and/or software configuration. Similarly, while various functionality is ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A method for generating an electronic message, the electronic message having the appearance of an individual performing with a musical artist, the method comprising:
   receiving, at an electronic message generation system having one or more processors, a selection of a video segment from a user, the video segment comprising:
      a song;
      a musical artist performing the song; and
      a character performing the song with the musical artist;
   receiving from the user, at the electronic message generation system, an image of the individual's face to overlay onto a facial area of the character;
   verifying, with the electronic message generation system, the image of the individual's face includes at least a pair of eyes and a mouth, is not tilted, does not have closed eyes, has a closed mouth;
   if the image of the individual's face does not include at least a pair of eyes and a mouth, is tilted, does have closed eyes, or has an open mouth, sending, from the electronic message generation system, a notification to the user of a specific problem with the image;
   receiving from the user, a recording of the individual signing the song;
   if the image of the individual's face does include at least a pair of eyes and a mouth, is not tilted, does not have closed eyes, and has a close mouth, generating, with the electronic message generation system, the electronic message from the video segment, wherein generating the electronic message comprises:
      overlaying the image of the individual's face onto the facial area of the character so that the electronic message has the appearance of the individual performing the song with the musical artist;
      graphically adjusting one or more facial features of the image to simulate movement of the one or more facial features to provide lifelike facial expressions for the character; and
      synchronizing the recording of the individual signing the song with the simulated movement of the one or more facial features to provide a lifelike appearance of the individual signing the song;
   receiving information from the user about a recipient of the electronic message; and
   transmitting the electronic message to the recipient based on the recipient information received from the user.

2. The method of claim 1, further comprising:
   receiving from the user, account information for an account associated with the recipient;
   staging a funds transfer transaction to transfer funds to the account associated with the recipient; and
   associating the funds transfer with the electronic message.

3. The method of claim 2, wherein associating the funds transfer with the electronic message comprises receiving a transaction identifier from the user, the transaction identifier having been provided to the user in response to staging the funds transfer transaction.

4. A method for generating an electronic message having the appearance of an individual performing with a musical artist, the method comprising:
   receiving at an electronic message generation system having one or more processors, a selection of a video segment from a user, the video segment comprising:
      a song;
      a musical artist performing the song; and
      a character performing the song with the musical artist;
   receiving from the user, at the electronic message generation system, an image of the individual's face;
   verifying, with the electronic message generation system, the image of the individual's face includes at least a pair of eyes and a mouth, is not tilted, does not have closed eyes, has a closed mouth;
   if the image of the individual's face does not include at least a pair of eyes and a mouth, is tilted, does have closed eyes, or has an open mouth, sending, from the electronic message generation system, a notification to the user of a specific problem with the image;
   if the image of the individual's face does include at least a pair of eyes and a mouth, is not tilted, does not have closed eyes, and has a close mouth, generating, with the electronic message generation system, the electronic message from the video segment, wherein generating the electronic message comprises:
      overlaying the image of the individual's face onto a facial area of the character; and
      simulating movement of one or more facial features of the image to provide lifelike facial expressions for the character;
   receiving information from the user about a recipient of the electronic message; and
   transmitting the electronic message to the recipient based on the recipient information received from the user.

5. The method of claim 4, wherein simulating movement of one or more facial features comprises simulating movement of one or more of the following facial features: the lips or the eyes.

6. The method of claim 4, wherein overlaying the image of the individual's face comprises simulating a depth of one or more facial features of the image to provide a lifelike appearance for the character.

7. The method of claim 4, further comprising receiving a selection of a gender, wherein selection of the gender determines the character displayed on the video segment performing the song with the musical artist.

8. The method of claim 4, further comprising setting one or more parameters of a microphone, the microphone being used to record the user singing the song.

9. The method of claim 8, wherein the one or more parameters for the microphone includes a recording volume level.

10. The method of claim 4, further comprising:
    recording the user signing the song; and
    synchronizing the recording of the user signing the song with the simulated movement of the one or more facial features of the image to provide a lifelike appearance of the individual signing the song.

11. The method of claim 10, further comprising:
    displaying the song lyrics while the user sings the song; and
    displaying the musical artist performing the song while the user sings the song.

12. The method of claim 10, further comprising adjusting one or more parameters of the recording of the user signing the song, the parameters being selected from the group consisting of:
    a volume of the recording in relation to the volume of the musical artist or the music;
    a pitch of the recording; and
    a tone of the recording.

13. The method of claim 12, wherein the one or more parameters of the recording of the user signing the song are adjusted automatically.

14. The method of claim 4, further comprising associating the electronic message with a funds transfer.

15. The method of claim 14, wherein associating the electronic message with the funds transfer comprises:
   receiving from the user, account information of an account associated with the recipient;
   staging the funds transfer to transfer funds to the account associated with the recipient; and
   associating the funds transfer with the electronic message.

16. The method of claim 14, wherein associating the funds transfer with the electronic message comprises receiving a transaction identifier from the user.

17. The method of claim 4, further comprising:
   recognizing a facial feature of the image to align the image with the facial area of the character or to ensure that the image includes a face.

18. The method of claim 17, wherein recognizing a facial feature comprises recognizing an eye or a mouth.

19. A system for generating an electronic message having the appearance of an individual performing with a musical artist comprising:
   a memory device; and
   a processor coupled with the memory device, the memory device having instructions stored thereon which, when executed by the processor, cause the processor to:
   receive a selection of a video segment from a user, the video segment comprising:
      a song;
      the musical artist performing the song; and
      the character performing the song with the musical artist;
   receive an image of the individual's face to overlay onto a facial area of the character;
   verify the image of the individual's face includes at least a pair of eyes and a mouth, is not tilted, does not have closed eyes, has a closed mouth;
   if the image of the individual's face does not include at least a pair of eyes and a mouth, is tilted, does have closed eyes, or has an open mouth, send a notification to the user of a specific problem with the image;
   if the image of the individual's face does not include at least a pair of eyes and a mouth, is not tilted, does not have closed eyes, and has a close mouth, generate the electronic message from the video segment by:
      overlaying the image of the individual's face onto the facial area of the character; and
      simulating movement of one or more facial features of the image to provide lifelike facial expressions for the character;
   receive information about a recipient of the electronic message; and
   transmit the electronic message to the recipient based on the recipient information received.

20. The system of claim 19, wherein the instructions further cause the processor to:
   receive a recording of the individual signing the song; and
   synchronize the recording with the simulated movement of the one or more facial features of the image.

21. The system of claim 19, wherein the instructions further cause the processor to:
   receive account information for an account associated with the recipient;
   stage a funds transfer transaction to transfer funds to the account associated with the recipient; and
   associate the funds transfer transaction with the electronic message.

* * * * *